United States Patent
Bitra et al.

(10) Patent No.: US 10,411,798 B2
(45) Date of Patent: Sep. 10, 2019

(54) POWER OPTIMIZED VLC SIGNAL PROCESSING WITH EFFICIENT HANDLING OF ISP/VFE

(71) Applicant: QUALCOMM Incorporated, San Diego, CA (US)

(72) Inventors: Suresh Kumar Bitra, Mangalagiri (IN); Aravind Korlepara, Tanuku (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/649,445

(22) Filed: Jul. 13, 2017

(65) Prior Publication Data

US 2019/0020412 A1   Jan. 17, 2019

(51) Int. Cl.
H04B 10/116   (2013.01)
H04B 10/66   (2013.01)

(52) U.S. Cl.
CPC ........... H04B 10/116 (2013.01); H04B 10/66 (2013.01)

(58) Field of Classification Search
CPC .................................................... H04B 10/116
USPC ........................................ 398/118, 115–116
See application file for complete search history.

(56) References Cited

U.S. PATENT DOCUMENTS

| | | | |
|---|---|---|---|
| 8,427,580 B1 * | 4/2013 | Patterson | H04N 5/232 348/211.11 |
| 9,330,171 B1 * | 5/2016 | Shetty | G06T 3/00 |
| 2003/0080984 A1 * | 5/2003 | Hunter | G06T 3/4015 345/698 |
| 2005/0265731 A1 * | 12/2005 | Keum | H04B 10/114 398/183 |
| 2009/0021621 A1 * | 1/2009 | Hashimoto | H04N 5/3456 348/300 |
| 2009/0027337 A1 * | 1/2009 | Hildreth | G06F 3/011 345/158 |
| 2011/0122308 A1 * | 5/2011 | Duparre | H01L 27/14621 348/340 |
| 2013/0026945 A1 * | 1/2013 | Ganick | G01S 1/70 315/246 |
| 2014/0006907 A1 * | 1/2014 | Roberts | H04L 1/0045 714/776 |
| 2014/0176579 A1 * | 6/2014 | Duluk, Jr. | G06T 1/20 345/506 |
| 2014/0270796 A1 * | 9/2014 | Jovicic | H04B 10/1141 398/128 |
| 2015/0093107 A1 * | 4/2015 | Jovicic | H04B 10/116 398/25 |
| 2015/0280823 A1 | 10/2015 | Breuer et al. | |
| 2015/0325041 A1 * | 11/2015 | Ha | G06T 15/506 345/426 |

(Continued)

FOREIGN PATENT DOCUMENTS

WO   WO-2016074548 A1   5/2016

*Primary Examiner* — Oommen Jacob
(74) *Attorney, Agent, or Firm* — Hunter Clark PLLC

(57) ABSTRACT

Methods, systems, and devices are described for processing Visual Light Communication (VLC) signals by identifying a subset of pixel elements likely to receive at least a portion of of detectable light transmitted from one or more VLC light sources, based on a first frame of pixel sample values. One method may include generating a second frame of pixel sample values of VLC signal intensities and limiting processing to the identified subset of the pixel elements.

25 Claims, 5 Drawing Sheets

(56) References Cited

U.S. PATENT DOCUMENTS

| | | | |
|---|---|---|---|
| 2016/0073008 A1* | 3/2016 | Masuyama | H04N 5/23212 348/349 |
| 2016/0119363 A1* | 4/2016 | Alam | H04L 63/126 726/7 |
| 2016/0127628 A1* | 5/2016 | Chan | H04N 5/2327 348/222.1 |
| 2016/0142867 A1* | 5/2016 | Kim | H02J 7/025 455/41.1 |
| 2016/0170007 A1 | 6/2016 | Ryan et al. | |
| 2016/0173200 A1* | 6/2016 | Chaillan | H04B 10/116 398/115 |
| 2016/0191159 A1 | 6/2016 | Aoyama et al. | |
| 2016/0203578 A1* | 7/2016 | Shoshan | G06T 3/4007 345/428 |
| 2016/0203583 A1* | 7/2016 | Shoshan | G06T 1/20 345/428 |
| 2016/0323035 A1* | 11/2016 | Jovicic | H04B 10/0795 |
| 2016/0351094 A1* | 12/2016 | Chaji | G09G 3/3225 |
| 2017/0094243 A1* | 3/2017 | Venkataraman | G06T 7/557 |
| 2017/0126725 A1* | 5/2017 | Pal | H04L 63/1433 |
| 2017/0148168 A1* | 5/2017 | Lindner | G06T 7/0002 |
| 2017/0150170 A1* | 5/2017 | Ahn | H04N 19/521 |
| 2017/0187933 A1* | 6/2017 | Duparre | H01L 27/14621 |
| 2017/0195596 A1* | 7/2017 | Vogelsang | H04N 5/347 |
| 2017/0201727 A1* | 7/2017 | Mendlovic | G02B 27/0075 |
| 2017/0214929 A1* | 7/2017 | Susnow | H03K 19/17732 |
| 2017/0228096 A1* | 8/2017 | Nathan | G06F 3/0416 |
| 2017/0347006 A1* | 11/2017 | Ryan | H04N 5/3532 |
| 2018/0084187 A1* | 3/2018 | Park | H04N 5/23212 |

\* cited by examiner

POWER OPTIMIZED VLC SIGNAL PROCESSING WITH EFFICIENT HANDLING OF ISP/VFE

BACKGROUND

1. Field

The present disclosure relates generally to visible light communications (VLC) via a digital imager.

2. Information

Recently, wireless communication employing light emitting diodes (LEDs), such as visible light LEDs, has been developed to complement radio frequency (RF) communication technologies. Light communication, such as Visible Light Communication (VLC), as an example, has advantages in that VLC enables communication via a relatively wide bandwidth. VLC also potentially offers reliable security and/or low power consumption. Likewise, VLC may be employed in locations where use of other types of communications, such as RF communications, may be less desirable. Examples may include in a hospital, on an airplane, in a shopping mall, and/or other indoor, enclosed, or semi-enclosed areas.

SUMMARY

Briefly, one particular implementation is directed to a method at a an imaging device comprising: a first sampling of one or more Visual Light Communication (VLC) signal intensities at an array of pixel elements to generate a first frame of pixel sample values. A subset of the pixel elements in the array are identified to include pixel elements that receive at least a portion of detectable light transmitted from one or more VLC light sources, based, at least in part, on the pixel sample values of the first frame. A second sampling of the VLC signal intensities at the array of pixel elements generates a second frame of pixel sample values. Processing of the second frame of pixel sample values is limited to pixel sample values of the second frame of pixel values generated by the subset of the pixel elements.

Another implementation is directed to an imaging device, comprising: an array of pixel elements configured to receive one or more Visual Light Communication (VLC) signals. Digital sampling circuitry may sample the intensity of the one or more VLC signals at the pixel elements of the array and generate successive frames of pixel sample values. A first and second frame of pixel sample values from the successive frames of pixel sample values generated by the digital sampling circuitry may be received. A subset of the pixel elements in the array that receive at least a portion of detectable light transmitted from one or more VLC light sources is identified, based, at least in part, on the pixel sample values of the first frame. The processing of the second frame of pixel sample values may be limited to the pixel sample values of the second frame generated by the identified subset of pixel elements.

It should be understood that the aforementioned implementations are merely example implementations, and that claimed subject matter is not necessarily limited to any particular aspect of these example implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
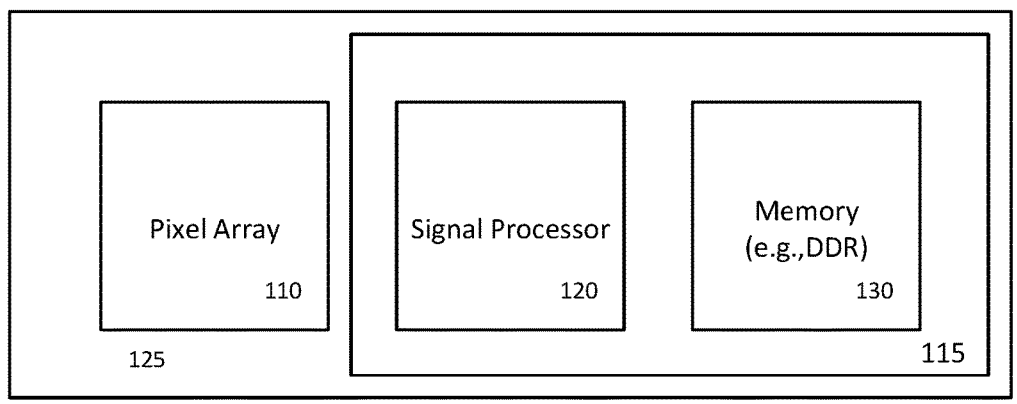
FIG. 1 is a schematic diagram illustrating an embodiment of one architecture for a system including a digital imager.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

A typical Visual Light Communication (VLC) system generally may include various VLC devices, such as a light source, which may, for example, comprise an access point (AP), such as a base station, for example. Alternatively, however, as discussed below, for one directional communication, e.g., a downlink without an uplink, for example, a modulating light source may be available that does not necessarily comprise an access point. Likewise, a VLC terminal may comprise a VLC receiver that does not necessarily otherwise communicate (e.g., transmit) VLC signals, for example. Nonetheless, a VLC terminal may, in an example embodiment, likewise comprise a portable terminal such, as a cellular phone, a Personal Digital Assistant (PDA), a tablet device, etc., or a fixed terminal, such as a desktop computer. For situations employing a AP and a VLC terminal in which communication is not necessarily one directional, such as having an uplink and a downlink, so to speak, for example, a VLC terminal may also communicate with another VLC terminal by using visible light in an embodiment. Furthermore, VLC may also in some situations be used effectively in combination with other communication systems employing other communication technologies, such as systems using other wired and/or wireless signal communication approaches, as discussed in more detail later.

VLC signals may use light intensity modulation for communication. VLC signals, which may originate from a modulating light source, may, for example, be detected and decoded by an array of photodiodes, as one example. However, likewise, an imager, such as a digital imager, having electro-optic sensors, such as CMOS sensors and/or CCD sensors, may include a capability to communicate via VLC signals in a similar manner (e.g., via detection and decoding). Likewise, an imager, such as digital imager, may be included within another device, which may be mobile in some cases, such as a smart phone, a tablet or may be relatively fixed, such as a desktop computer, etc.

However, default exposure settings for a digital imager, for example, may more typically be of use in digital imaging (e.g., digital photography) rather than VLC signal communications. As such, default exposure settings may result in attenuation of VLC signals with a potential to possibly render VLC signals undetectable and/or otherwise unusable for communications. Nonetheless, as shall be described, a digital imager (DI) may be employed in a manner so that use in an imager may permit VLC signal communications to occur, which may be beneficial, such as in connection with position/location determinations, for example.

Global navigation satellite system (GNSS) and/or other like satellite positioning systems (SPSs) have enabled navigation services for mobile devices, such as handsets, in typically outdoor environments. However, satellite signals may not necessarily be reliably received and/or acquired in an indoor environment; thus, different techniques may be employed to enable navigation services for such situations. For example, mobile devices typically may obtain a position fix by measuring ranges to three or more terrestrial wireless access points, which may be positioned at known locations. Such ranges may be measured, for example, by obtaining a media access control (MAC) identifier or media access (MAC) network address from signals received from such access points and by measuring one or more characteristics of signals received from such access points, such as, for example, received signal strength indicator (RSSI), round trip delay (RTT), etc., just to name a few examples.

However, it may likewise be possible to employ Visual Light Communication technology as an indoor positioning technology, using, for example, in one example embodiment, stationary light sources comprising light emitting diodes (LEDs). In an example implementation, fixed LED light sources, such as may be used in a light fixture, for example, may broadcast positioning signals using rapid modulation, such as of light intensity level (and/or other measure of amount of light generated) in a way that does not significantly affect illumination otherwise being provided.

Thus, in an embodiment, light fixtures may broadcast positioning signals by modulating generated light output intensity level over time in a VLC mode of communication. Light Emitting Diodes (LEDs) may replace fluorescent lights as a light source, such as in a building, which may potentially result in providing relatively high energy efficiency, relatively low total cost of ownership, and/or relatively low environmental impact, for example.

Unlike fluorescent lighting, LEDs typically are produced via semiconductor manufacturing processes and can modulate light intensity at relatively high frequencies. Using modulation frequencies in a range, such as in the KHz range, as an example, should not generally be perceivable by a typical human eye. However, modulation in this range, for example, may be employed to provide signal positioning. Likewise, to provide and/or maintain relatively consistent energy efficiency in a mode to provide position signaling, simple, binary modulation, as an illustration, may be used in an embodiment, such as pulse width modulation, for example. In general, any one of a host of possible approaches are suitable and claimed subject matter is not intended to be limited to illustrations; nonetheless, some examples include multiple IEEE light modulation standards like On-off keying (OOK), Variable pulse position modulation (VPPM), etc.

In an embodiment, for example, a light fixture may provide a VLC signal with a unique identifier to differentiate a light fixture from other light fixtures out of a group of light fixtures, such as in a venue, for example. A map of locations of light fixtures and corresponding identifiers, such as for a venue, for example, may be stored on a remote server, for example, to be retrieved. Thus, a mobile device may download and/or otherwise obtain a map via such a server, in an embodiment, and reference it to associate a fixture identifier with a decoded VLC signal, in an example application.

From fixture identifiers alone, for example, a mobile device may potentially estimate its position to within a few meters. With additional measurement and processing of VLC signals, a mobile device may potentially further narrow an estimate of its position, such as to within a few centimeters. An array of pixels (e.g., pixel elements) of a digital imager, may be employed for measuring appropriately modulating VLC signals emitted from one or more LEDs, for example. In principle, a pixel in an array of a DI accumulates light energy coming from a relatively narrow set of physical directions. Thus, processing of signals capturing measurements via pixels of an array of a DI may facilitate a more precise determination regarding direction of arrival of light so that a mobile device, for example, may compute its position relative to a light fixture generating modulated signals to within a few centimeters, as suggested. Thus, as an example embodiment, signal processing may be employed to compute position/location, such as by using a reference map and/or by using light signal measurements, such as VLC signals, to further narrow an estimated location/position.

For example, a location of a DI, such as part of a mobile device, for example, with respect to a plurality of locations of a plurality of light fixtures, may be computed in combination with a remote server map that has been obtained, as previously mentioned. Thus, encoded light signals may be received from at least two light fixtures having known (x, y) image coordinates, for example. A direction-of-arrival of respective encoded light signals may be computed in terms of a pair of angles relative to a coordinate system of a receiving device, such as a mobile device, as mentioned. A height of a light fixture with reference to an x-y plane parallel to the earth's surface may be determined (e.g., by computation and/or lookup). Thus, orientation of a mobile device, for example, relative to the x-y plane parallel to the earth's surface may be computed. Likewise, a tilt relative to a gravity vector (e.g., in a z-x plane and a z-y plane) may be measured (e.g., based at least in part on gyroscope and/or accelerometer measurements). Therefore, direction-of-arrival of respective encoded light signals may be computed in terms of a pair of angles relative to the x-y plane parallel to the earth's surface and a location may be computed relative to a map based at least in part on known (x, y) image coordinates of the light fixtures, previously mentioned. Signal processing in this manner might be considered analogous to "beamforming" such as may be used for radio receivers, for example, if multiple light fixtures are employed. Thus, processing signals to compute position relative to one or more fixtures with one or more known fixture locations from one or more decoded identifier may permit a mobile device to determine a position/location, such as global position/location with respect to a venue with cm-level accuracy.

Thus, in an example implementation, positioning signals may potentially be received by a DI, such as may, for example, be mounted in a mobile device, such as a smart phone. For example, a DI may be included as a front-facing digital camera, as simply one example. Sensors, such as electro-optical sensors, included within a DI, for example, may capture line of sight light energy that may impinge upon the sensors, which may be used to compute position, such as in a venue, as suggested above. Captured light energy may comprise signal measurements, such as for VLC signals, for example. Measured VLC signals may be demodulated and decoded by a mobile device to produce a unique fixture identifier. Furthermore, multiple light fixtures if in a field of view (FOV) may potentially be processed.

A digital imager, again, as an example, may comprise an array of pixels (e.g., pixel elements) such as, for example, charged-coupled devices and/or CMOS devices, which may be used for digital imaging. A pixel array, for example, in an embodiment, may comprise several electro-optic devices, that may be responsive to light impinging on a surface of the respective devices. In an embodiment, pixel elements may be sampled at a rate of 50 Hz-150 Hz for VLC processing. However, processing VLC signals with a full pixel array of a digital imager, for example, may consume excessive amounts of relatively scarce power or may use excessive amounts of available memory, which also comprises a limited resource typically, such as for a mobile device. Furthermore, to cover a full field of view, a digital imager may operate at full resolution, for example, 12 MP.

One approach may be to adjust exposure time for electro-optic sensors of a DI based at least in part on presence of detectable VLC signals; however, one disadvantage may be that doing so may interfere with typical imager operation (e.g., operation to produce digital images). For example, a digital imager, such as for a mobile device, in one embodiment, may employ an electronic shutter to read and/or capture a digital image one line (e.g., row) of a pixel array at a time. Exposure may, for example, in an embodiment, be adjusted by adjusting read and reset operation as rows of an array of pixels are processed. Thus, it might be possible to adjust read and reset operations so that exposure to light from a timing perspective, for example, is more conducive to VLC processing. However, again, a disadvantage may include potential interference with typical imager operation.

According to another approach, it is noted that while a digital imager may capture a frame of light signal measurements, for VLC communications, fewer light signal measurements may be employed with respect to VLC communications without significantly affecting performance so as to potentially reduce power consumption and/or use of limited memory resources, for example. Typically, for example, mobile digital imagers, such as may be employed in a smart phone, as an illustration, may employ a rolling shutter, and sensor measurements may be read line by line (e.g., row by row), as previously mentioned. Thus, relatively high frame rates, such as 240 fps, for example, may consume bandwidth over a bus which may communicate captured measurements for frames of images, such as for operations that may take place between an image processor and memory. For VLC communications, for example, a reduced number pixels in an image frame may be processed. Further to this example, for VLC communications in some embodiments, only image pixel signals from pixels in certain regions of an array of pixels, may be processed.

Unfortunately, a particular region in an array of pixels that is likely to receive VLC signal energy may be unknown or difficult to determine. For example, in an embodiment, a digital imager may be configured to lower power consumption by limiting operation to a particular region (e.g., a 5 MP area in a 12 MP array) to thereby lower a data rate. However, limiting operation of a digital imager to a particular region may interfere with measurement of one or more VLC light sources of interest.

Because fewer measurements may be employed in connection with VLC communications, it may be desirable to communicate and/or process fewer measurements so that less bandwidth and less processing resources are consumed, which may enable savings in power and/or memory utilization, without interfering with the measurement of one or more VLC light sources of interest, as suggested.

Accordingly, in embodiments, a first sampling of one or more Visual Light Communication (VLC) signal intensities at an array of pixel elements generates a first frame of pixel sample values. A subset of the pixel elements in the array identified which include pixel elements that receive at least a portion of detectable light transmitted from one or more VLC light sources. The identification of this subset of pixel elements is based, at least in part, on the pixel sample values of the first frame of pixel sample values. A second sampling of one or more Visual Light Communication (VLC) signal intensities at the array of pixel elements generates a second frame of pixel sample values. The processing of the second frame of pixel sample values is limited to pixel sample values of the second frame of pixel values generated by the identified subset of the pixel elements.

In embodiments, the subset of pixel elements of the pixel element array of the imaging device may cover a first region of pixel elements in the array of pixel elements. A second sampling of the VLC signal intensities at the pixel elements may determine a second region of pixel elements within the first region of pixel elements, based, at least in part, on pixel sample values of the second frame of pixel sample values. The processing of a third frame of pixel sample values generated from a third sampling of VLC signal intensities at the array of pixel elements may be limited to pixel sample values generated by pixels in the second region of the pixel elements in the array. In some embodiments, the second region of pixel elements may be determined, at least in part, based on a change in orientation of the imaging device.

Advantageously, because these methods may control the pixel values that need to be processed, for example, by just sending an indication of the subset of the rows where a VLC signal is available, power consumption can be reduced. For example, if for a given frame rate, P is the power takes for sending the complete image sensor pixels info (M Mega pixels) and N is the subset of pixels covering a light fixture field of view, then the power consumption in a particular implementation may be P*(N/M). Additionally, less memory storage and bandwidth may be required for image signal processor (ISP)/(video front end) VFE, DDR memory, and VLC decoder. In other words, because there may be less raw data, there may be fewer tasks, fewer processing requirements and so less power consumption. Further, if there is less raw data movement between ISP/VFE to DDR and then to a VLC decoder, overall power may be reduced in the same ratio. And because the ISP/VFE and VLC decoder are using fewer buffers to store the VLC raw data, this requires less hardware, and thus, again, less power.

FIG. 1 is a schematic diagram illustrating a possible embodiment, such as 100, of an architecture for processing light signals (e.g., light signal measurements) received at a DI of a mobile device (e.g., in a smartphone). Thus, as illustrated in this example, an imager 125 may include a pixel array 110, a signal processor (SP) 120 and memory 130, such as DDR memory, for example, in one embodiment. As shall be described, circuitry, such as circuitry 115, which includes SP 120 and memory 130, may extract measured VLC signals and measured light component signals for an image from pixels of array 110. For example, an array, such as 110, may include pixels in which light signal measurements that are to be captured may include measurements of light component signals for an image and measurements of VLC signals, as described in more detail below. However, since the respective signals (e.g., VLC signals and light component signals for an image) may undergo separate and distinct downstream processing from the array of pixels in a device, such as a mobile device, it may be desirable to extract one from the other, such as extract VLC signals, for example, from captured measurements. For example, VLC signals and light component signals may be separately assembled from light signal measurements of a captured image so that concurrent processing may take place, in an embodiment.

Extraction, assembly and processing of signals from an array of pixels may be accomplished in a variety of approaches, as described below for purposes of illustration. In addition, in one embodiment, photodiodes, as an example, dedicated to capturing light for VLC signal processing may be employed potentially with reduced power consumption and/or improved measurement sensitivity over typical DI imager sensors, such as CCD and/or CMOS sensors, for example. Of course, claimed subject matter is not intended to be limited to examples, such as those described for purposes of illustration. However, as alluded to, one possible advantage of an embodiment may include a capability to receive and process VLC signal measurements while concurrently employing a DI to also capture and process light component signal measurements for a digital image. It is noted, as discussed in more detail later, this may be accomplished via a combination of hardware and software in an implementation.

For example, in an embodiment, SP 120 may include executable instructions to perform "front-end" processing of light component signals and VLC signals from array 110. In this example, an array of pixels may be processed row by row, as previously suggested. That is, for example, signals captured by a row of pixels of an array, such as 110, may be provided to SP 120 so that a frame of an image, for example, may be constructed (e.g., assembled from rows of signals), in "front end" processing to produce an image, for example. For measurements that may include VLC signals, those VLC signal measurement portions may be extracted in order to process VLC signals separately from light component signal measurements for an image (e.g., a frame). In this context, the term 'extract' used with reference to one or more signals and/or signal measurements refers to sufficiently recovering one or more signal and/or signal measurements out of a group or set of signal and or signal measurements that includes tine one or more signal and/or signal measurements to be recovered so as to be able to further process the one or more signal and/or signal measurements to be recovered to a state in which the one or more signal and/or signal measurements to be recovered are sufficiently useful with regard to the objective of the extraction.

An embodiment, described in further detail below, may include systematically processing measurements from an identified subset of pixel elements, so that a higher proportion of the identified subset includes content being sought. For example, an embodiment may comprise receiving a first frame of pixel sample values generated from a first exposure of an array of light sensitive pixel elements to light signals; identifying a subset of the pixel elements in the array to include at least a portion of detectable light transmitted from a visual light communication (VLC) light source based, at least in part, on the pixel sample values of the first frame; and limiting processing of pixel sample values of a second frame of pixel sample values generated from a second exposure of the array of light sensitive pixel elements to pixel sample values of the second frame of pixel values generated by the subset of the pixel elements.

Processing via SP 120 in accordance with executable instructions may be referred to as software or firmware extraction of VLC signals (e.g., via execution of instructions by a signal processor, such as 120). Thus, in an embodiment, for example, SP 120 may execute instructions to perform extraction of VLC signals and to perform additional processing, such as determining the pixels that are likely to receive detectable energy from a VLC light source ("likely VLC energized pixels"). For example, likely VLC energized pixels in an image sensors may change based on factors such as changes in orientation relative to a location of a VLC light source, jitter, etc. Jitter and orientation, for example, may be taken into account in various ways. According to an embodiment, particular likely VLC energized pixels may be tracked with help of inertial sensors, accelerometers, and/or similar sensors, and pixel sample values processed from previous image sensor frames. The likely VLC energized pixels may be tracked by various image processing techniques, for example, detecting movement of image boundaries, detecting movement of image features, or any other techniques for detecting movement or jitter through image processing. These are illustrative examples only, and claimed subject matter is not limited in this respect. According to an embodiment, a VLC decoder may track likely VLC energized pixels from frame to frame, and process and decode the VLC info.

In other embodiments, the likely VLC energized pixels may be determined based, at least in part, on detecting jitter of the imaging device. Also, the subset of pixels comprising at least a portion of the likely VLC energized pixels may be determined to cover a region including at least one of the one or more VLC light sources. In yet another embodiment, the subset of pixel elements including likely VLC energized pixels may be based, at least in part, on a measured level of jitter of the imaging device.

Although claimed subject matter is, of course, not limited to illustrative examples, as one example to provide an illustration, a digital imager may include capabilities to perform real-time or nearly real-time adjustment to identify and track VLC light sources. This may include, as non-limiting examples, zooming capability, focus capability, processing based on environmental factors such as movement of the digital imager, movement of a VLC light source, etc. Thus, in an embodiment, for example, SP 120, for example, may fetch and execute computer instructions to process VLC signals in coordination with these capabilities, such as part of VFE processing, as previous mentioned. As an example, in response to movement of a device that includes a digital imager that has moved closer to or further away from one or more VLC light sources for example, SP 120 may employ content generated dynamically to increase the likelihood of capturing VLC signals from one or more VLC light sources.

Figure 2:
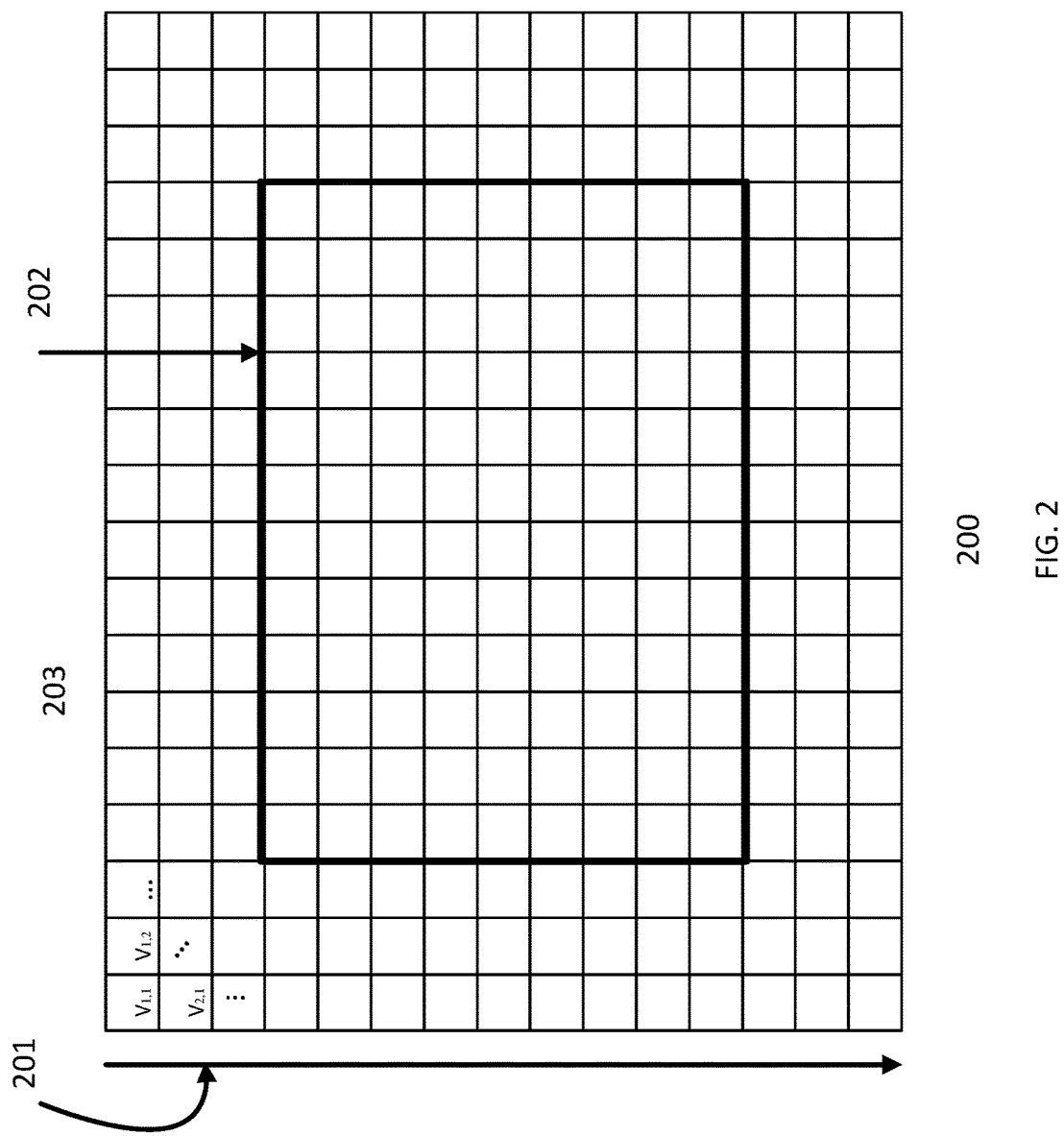
FIG. 2 illustrates an embodiment of pixel element array.

FIG. 2 illustrates an embodiment 200 of a pixel element array 203, such as pixel array 110 in FIG. 1, or a portion thereof. $V_{1,1}$ represents a pixel of a first row and a first column of pixel array 200. Similarly $V_{1,2}$ represents a pixel of a first row and a second column of pixel array 210 and $V_{2,1}$ represents a pixel of a second row and a first column of pixel array 210. Pixel array 210 may readout pixel sample values in a row at a particular time and send these pixel sample values to a video front end (VFE), as described in more detail below), for further processing. As illustrated by arrow 201, the pixel array may readout pixel sample values for successive rows at successive times, sending each row of pixel sample values to the VFE for further processing.

Figure 3:
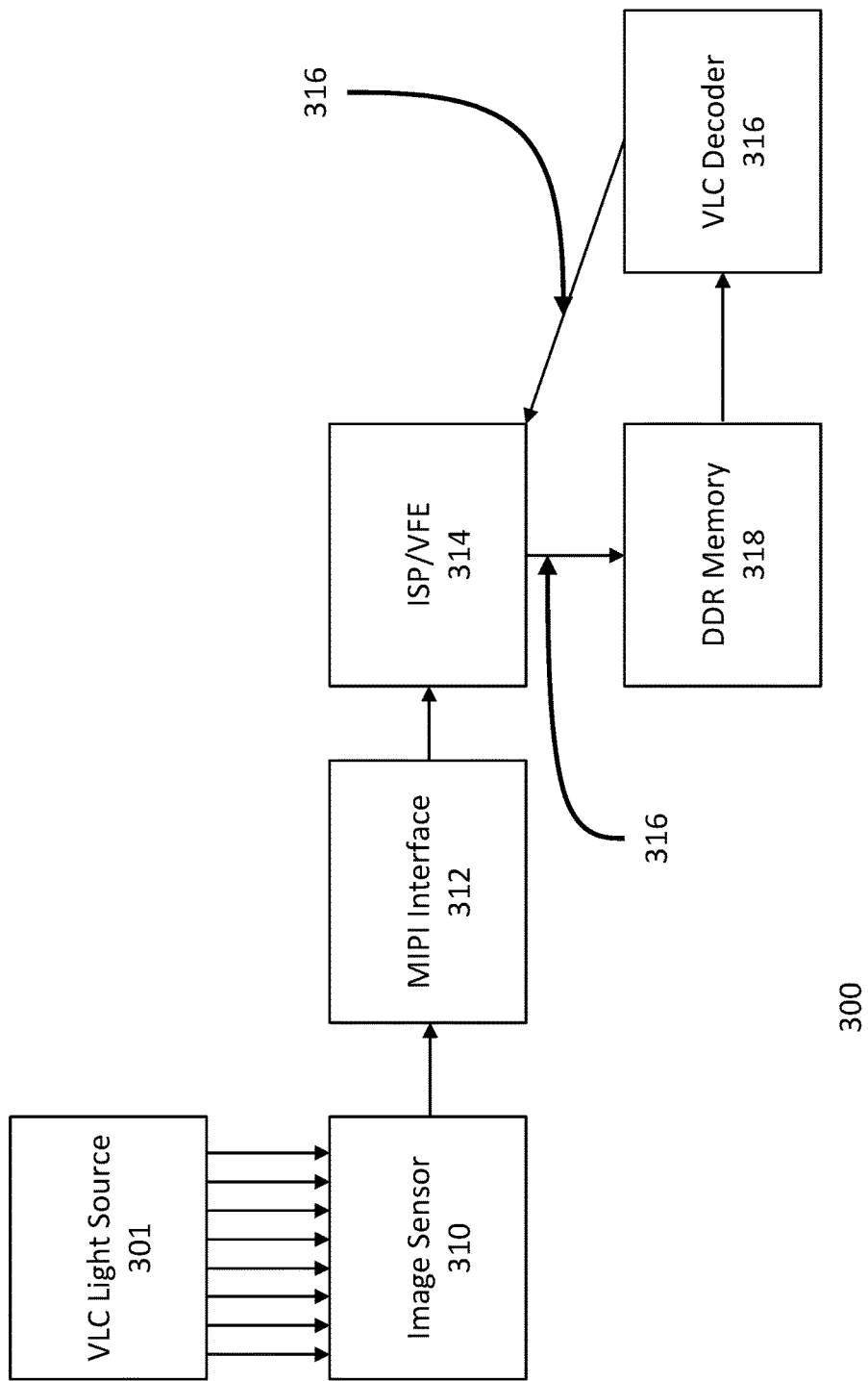
FIG. 3 is a schematic diagram illustrating another embodiment of an architecture for a system including a digital imager.

FIG. 3 is a schematic diagram illustrating another embodiment 300 of an architecture for a system including a digital imager. Embodiment 300 is a more specific implementation, again provided merely as an illustration, and not intended to limit claimed subject matter. In many respects, it is similar to previously described embodiments, such as including an array of pixels, at a sensor 310, including a signal processor, such as image signal processor 314, and including a memory, such as DDR memory 318. FIG. 3 also shows VLC decoder 316 for decoding VLC light signals.

FIG. 3, as shown, illustrates VLC light signals 301 impinging upon sensor 310. It is noted, however, that in embodiment 300, before image signal processor 314, which implements a VFE, as previously described, signals from a pixel array pass via a mobile industry processor interface (MIPI) 312, which provides signal standardization as a convenience. It is noted that the term "MIPI" refers to any and all past, present and/or future MIPI Alliance specifications. MIPI Alliance specifications are available from the MIPI Alliance, Inc. Likewise, after front end processing, signals are provided to memory. VLC light signals, for example, after being provided in memory 318, may be decoded by decoder 316 and then may return to ISP/VFE314 for further processing.

Continuing with reference to FIG. 3, in an embodiment, sensor 310 may send out sampled pixel values in accordance with a frame rate (f). For example, if we have 1000 rows and frame rate is 50 Hz, then image sensor read the rows at every 20 milliseconds one after another sequentially. Accordingly, image sensor 310 may generate a large amount of raw data one row at time sequentially to the ISP/VFE 314, and ISP/VFE 314 process it and transfer it to DDR memory 318 for further processing by VLC decoder 316 (e.g., for content signal detection and demodulation). Transfer of this much amount of data from image sensor 310 to ISP/VFE 314 and then to DDR memory 318 consumes significant power and memory resources, particularly if high speed data downloads are being performed using VLC signals (e.g., while operating the image sensor at 150 frames per sec).

According to an embodiment, modification of processing of VLC signals as shown in FIG. 3 may significantly reduce power consumption by eliminating redundant or unwanted processing by ISP/VFE 314 during VLC activity. If a device is performing VLC activity and not image capturing activity, VLC decoder 316 can detect this and provide content to inform ISP/VFE 314 that the device is operating in VLC mode. Further, VLC decoder 316 can provide "VFE-VLC assistance content" to ISP/VFE 314 as follows.

During an initial time frame, VLC decoder 316 can listen to the full frames of pixel sample values and then determine pixels that are likely receiving detectable energy from a VLC light source ("likely VLC energized pixels"). VLC decoder 316 may provide VFE-VLC assistance content to ISP/VFE 314 corresponding to likely VLC energized pixels. Likely VLC energized pixels may be located within a grid of pixels across multiple rows and columns (shown as inner box 202 in FIG. 2). Likely VLC energized pixels in image sensor 310 may change based on factors such as changes in orientation of an imaging device relative to a location of a VLC light source, jitter, etc. According to an embodiment, particular likely VLC energized pixels may be tracked with help of inertial sensors and pixel sample values processed from previous image sensor frames.

According to an embodiment, VLC decoder 316 tracks likely VLC energized pixels from frame to frame, and processes and decodes the VLC pixel sample values. Once VLC decoder 316 has determined particular likely VLC energized pixels for a VLC light source, parameters for VFE-VLC assistance content may be determined. VFE-VLC assistance content may include, in some embodiments, for particular likely VLC energized pixels, identification of image sensor rows and columns. VFE-VLC assistance content may predict the next likely VLC energized pixels and the corresponding rows and column based on any detected motion of sensor. As stated above, VLC decoder 316 provides VFE-VLC assistance content to ISP/VFE 314 by sending these parameters to ISP/VFE 314, as indicated by arrow 320, so that ISP/VFE 314 can optimize its performance.

In an embodiment, once ISP/VFE 314 receives the "VFE-VLC assistance content," ISP/VFE 314 can use the parameters to reject pixel sample values, as chunks of individual rows, sequentially, from image sensor 310 for rows which are indicated to not have the appropriate VLC signals. Additionally, ISP/VFE 314 may compare the VFE-VLC assistance data, in particular, the identified VLC signal embedded rows and columns to check if a received row of pixel sample values is part of the VLC signal available row or not. In some embodiments, for rows indicated to not be receiving pixel sample values from image sensor 310, ISP/VFE 314 can discard those pixel sample values without saving in its internal buffers. Similarly, for the pixel sample values from rows indicated to be include VLC content from the image sensor, ISP/VFE 314 can save that content in its internal buffer, as indicated by arrow 325.

Figure 4:
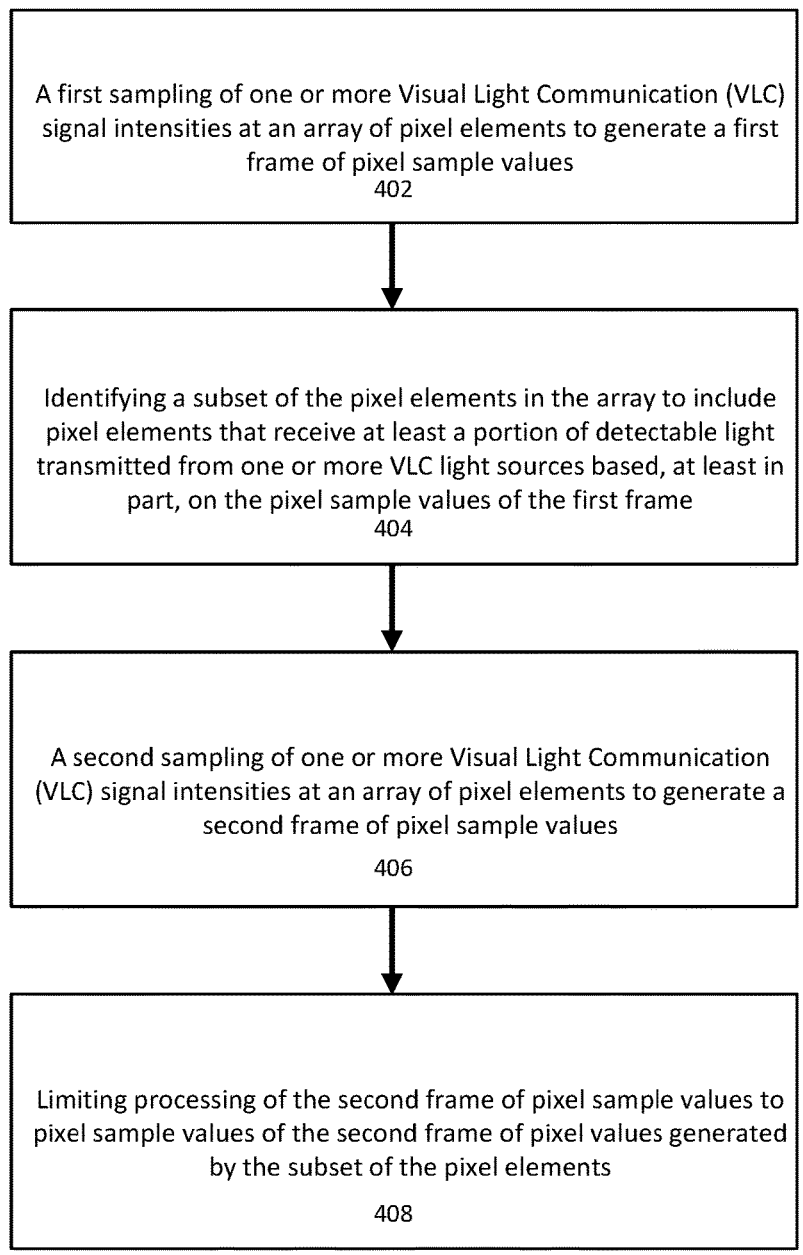
FIG. 4 is a flow diagram of an embodiment of a method to process light signals.

FIG. 4 is a flowchart of an illustrative embodiment for measuring and processing VLC signals via an imaging device. For this and other flowcharts in this disclosure, it should be appreciated that even though one or more operations are illustrated and/or may be described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Continuing with reference to FIG. 4, at block 402, there is a first sampling of one or more Visual Light Communication (VLC) signal intensities at an array of pixel elements to generate a first frame of pixel sample values. For example, image sensor 310 may receive VLC signals 301, as shown in FIG. 3 and described above. At block 404, a subset of the pixel elements in the array are identified to include pixel elements that receive at least a portion of detectable light transmitted from a VLC light source based, at least in part, on the pixel sample values of the first frame. For example, as also shown in FIG. 3, VLC decoder 316 may determine which pixel elements receive a portion of detectable light transmitted from a VLC light source such as VLC light source 301, based at least in part on the pixel sample values of the first frame. In an embodiment, the pixel sample values of the first frame are transmitted from image sensor 310 to MIPI interface 312, then to ISP/VFE 314, and then to VLC decoder 316, as shown and described above in connection with FIG. 3.

According to an embodiment, the subset of pixel values may be similar to the inner box 202 shown in FIG. 2, and described in connection with FIGS. 2 and 3. The inner box 202 may include likely VLC energized pixels located within a grid of pixels across multiple rows and columns. The subset of pixel elements may cover a first region of pixel elements in the array. The subset of pixel elements may be determined, at least in part, on a detected level of jitter of the imaging device. Moreover, a size of a region covered by the subset of pixels may be changed in response to detection of a level of jitter. In embodiments, a signal may be generated at a VLC decoder device indicative of the subset of pixel elements. For example, as described above, VLC decoder 316 may identify a subset of pixels similar to the inner box 202 shown in FIG. 2, and generate a signal indicative of that subset of pixel elements.

At block 406, there is a second sampling of one or more VLC signal intensities at an array of pixel elements to generate a second frame of pixel sample values. Again, as an example, image sensor 310 may receive VLC signals 301, as in FIG. 3, thus enabling a second sampling. The generated pixel sample values may be sent to MIPI interface 312, ISP/VFE 314, and VLC decoder 316. Some or all of the pixel sample values may be stored in DDR memory 318.

In embodiments, a second region of the pixel elements in the array is determined, based, at least in part, on a measured change in orientation of the imaging device relative to the VLC source. For example, the pixel sample values generated during the second sampling may be sent from image sensor 310 to MIPI interface 312 and then to ISP/VFE 314. ISP/VFE may store all or some of the received pixel sample values in DDR memory 318, where, in embodiments, the pixel sample values become available to VLC decoder 316. VLC decoder 316 may determine which pixel elements receive a portion of detectable light transmitted from a VLC light source such as VLC light source 301, based at least in part on the pixel sample values of the second frame. In addition, VLC decoder 316 may determine whether there is any change in orientation of the imaging device. In some embodiments, VLC decoder 316 may determine a second region of pixels based in part on whether there is any measured change in orientation of the imaging device to a VLC light source.

At block 408, processing of the second frame of pixel sample values is limited to pixel sample values of the second frame of pixel values generated by the subset of the pixel elements. For example, as shown and described in connection with FIGS. 2-3, ISP/VFE 314 may process only a subset of pixels, an illustrative, non-limiting, example of which is shown by inner box 202 of pixel elements. In embodiments, the processing of the second frame of pixel sample values is limited to the identified subset of pixel elements based, at least in part, on the signal, generated by VLC decoder 316, which is indicative of the identified subset of pixel elements.

In embodiments, there may be a third sampling of VLC signals of pixel sample values. Processing of the third frame of pixel sample values may be limited to a second region of pixel elements, as described above. For example, ISP/VFE 314 may be limited to processing pixel sample values generated from a pixel elements in a second region of the image sensor 310, during a third sampling of VLC signals at image sensor 310. In embodiments, the second region of the pixel elements is determined based, at least in part, on a measured change of orientation of an imaging device relative to a VLC light source, such as VLC light source 301.

Figure 5:
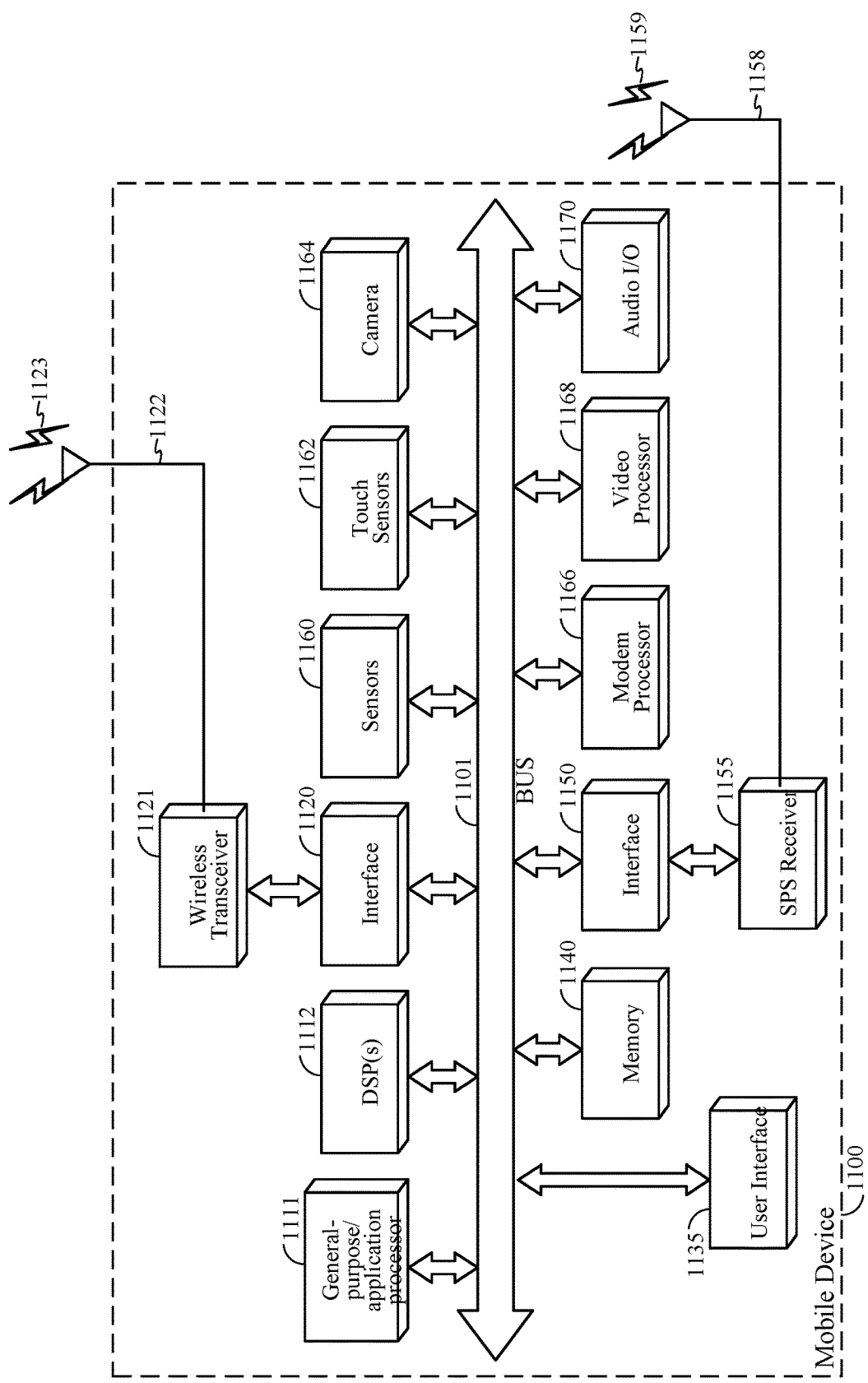
FIG. 5 is a schematic diagram illustrating features of a mobile device according to an embodiment.

FIG. 5 is a schematic diagram illustrating features of a mobile device according to an embodiment. Subject matter shown in FIG. 5 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "mobile device," "wireless station," "wireless transceiver device" and/or similar terms; however, if it is determined, for some reason not immediately apparent, that the foregoing understanding cannot stand and that 35 USC § 112(f) therefore, necessarily is implicated by the use of the term "computing device," "mobile device," "wireless station," "wireless transceiver device" and/or similar terms, then, it is intended, pursuant to that statutory section, that corresponding structure, material and/or acts for performing one or more actions to be understood and be interpreted to be illustrated in at least in FIGS. 4 and 5, and described in corresponding text of the present disclosure.

In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee, Bluetooth or other wireless communication standards mentioned elsewhere herein, just to name a few examples.

Mobile device 1100 may also comprise SPS receiver 1155 capable of receiving and acquiring SPS signals 1159 via SPS antenna 1158. For example, SPS receiver 1155 may be capable of receiving and acquiring signals transmitted from one global navigation satellite system (GNSS), such as the GPS or Galileo satellite systems, or receiving and acquiring signals transmitted from any one several regional navigation satellite systems (RNSS') such as, for example, WAAS, EGNOS, QZSS, just to name a few examples. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown). Mobile device 1100 may provide one or more sources of executable computer instructions in the form of physical states and/or signals (e.g., stored in memory such as memory 1140). In an example implementation, DSP(s) 1112 or general-purpose processor(s) 1111 may fetch executable instructions from memory 1140 and proceed to execute the fetched instructions. DSP(s) 1112 or general-purpose processor(s) 1111 may comprise one or more circuits, such as digital circuits, to perform at least a portion of a computing procedure and/or process. By way of example, but not limitation, DSP(s) 1112 or general-purpose processor(s) 1111 may comprise one or more processors, such as controllers, microprocessors, microcontrollers, application specific integrated circuits, digital signal processors, programmable logic devices, field programmable gate arrays, the like, or any combination thereof. In various implementations and/or embodiments, DSP(s) 1112 or general-purpose processor(s) 1111 may perform signal processing, typically substantially in accordance with fetched executable computer instructions, such as to manipulate signals and/or states, to construct signals and/or states, etc., with signals and/or states generated in such a manner to be communicated and/or stored in memory, for example.

Memory 1140 may also comprise a memory controller (not shown) to enable access of a computer-readable storage medium, and that may carry and/or make accessible digital content, which may include code, and/or computer executable instructions for execution as discussed above. Memory 1140 may comprise any non-transitory storage mechanism. Memory 1140 may comprise, for example, random access memory, read only memory, etc., such as in the form of one or more storage devices and/or systems, such as, for example, a disk drive including an optical disc drive, a tape drive, a solid-state memory drive, etc., just to name a few examples. Under direction of general-purpose processor(s) 1111, DSP(s) 1112, video processor 1168, modem processor 1166 and/or other specialized processors (not shown), a non-transitory memory, such as memory cells storing physical states (e.g., memory states), comprising, for example, a program of executable computer instructions, may be executed by general-purpose processor(s) 1111, memory 1140, DSP(s) 1112, video processor 1168, modem processor 1166 and/or other specialized processors for generation of signals to be communicated via a network, for example. Generated signals may also be stored in memory 1140, also previously suggested.

Memory 1140 may store electronic files and/or electronic documents, such as relating to one or more users, and may also comprise a device-readable medium that may carry and/or make accessible content, including code and/or instructions, for example, executable by general-purpose processor(s) 1111, DSP(s) 1112, video processor 1168, modem processor 1166 and/or other specialized processors and/or some other device, such as a controller, as one example, capable of executing computer instructions, for example. As referred to herein, the term electronic file and/or the term electronic document may be used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Mobile device 1100, as depicted in FIG. 6, is merely one example, and claimed subject matter is not limited in scope to this particular example.

While mobile device 1100 is one particular example implementation of a computing device, other embodiments of a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, and/or a display with a higher degree of functionality, such as a touch-sensitive color 2D or 3D display, for example.

Also shown in FIG. 5, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, actions may be performed in response execution of one or more executable computer instructions stored in memory 1140 such as on a computer-readable storage medium, such as RAM, ROM, FLASH, or disc drive, just to name a few examples. The one or more instructions may be executable by general-purpose processor(s) 1111, DSP(s)

1112, video processor 1168, modem processor 1166 and/or other specialized processors. Memory 1140 may comprise a non-transitory processor-readable memory and/or a computer-readable memory that stores software code (programming code, instructions, etc.) that are executable by processor(s) 1111, DSP(s) 1112, video processor 1168, modem processor 1166 and/or other specialized processors to perform functions described herein. In a particular implementation, wireless transceiver 1121 may communicate with general-purpose processor(s) 1111, DSP(s) 1112, video processor 1168 or modem processor through bus 1101. General-purpose processor(s) 1111, DSP(s) 1112 and/or video processor 1168 may execute instructions to execute one or more aspects of processes, such as discussed above in connection with FIGS. 4A and 4B, for example.

Also shown in FIG. 5, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112, video processor 1168 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., a charge coupled device or CMOS imager), lens, analog to digital circuitry, frame buffers, just to name a few examples. In embodiments, such as discussed above in connection with blocks 402, 502 and 602 of FIGS. 4-6 respectively, the array of pixels exposed to light signals may comprise such an imaging sensor. Moreover, the digital samples generated in blocks 402, 502 and 602 of FIGS. 4-6, respectively, may also be enabled by such imaging sensors. In one implementation, additional processing, conditioning, encoding or compression of signals representing captured images may be performed at general purpose/application processor 1111 or DSP(s) 1112. For example, as discussed above in connection with blocks 408, 510, and 608 of FIGS. 4-6, respectively, further processing of the samples may be performed by such a processor. Of course, this is an illustrative example, and any other suitable processor may be used, as will be discussed. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100. Alternatively, this could all be performed by a dedicated VLC processor/decoded in coupled communication with bus 1101. For example, a DSP, ASIC or other device may be employed. In one particular implementation, however, video processor 1168 may be capable of processing signals responsive to light impinging pixels in an imaging sensor (e.g., of camera 1164) exposed to light signals such as VLC light signals. As discussed above, a VLC signal transmitted from a light source may be modulated based, at least in part, on one or more symbols (e.g., a MAC address or a message) that may be detected or decoded at a receiving device. In one implementation, video processor 1168 may be capable of processing signals responsive to light impinging pixels in an imaging sensor to extract or decode symbols modulating VLC light signals (e.g., a MAC address or a message). Furthermore, video processor 1168 may be capable of obtaining a received signal strength measurement or a time of arrival referenced to a synchronized clock based on such processing of signals responsive to light impinging pixels in an imaging sensor for use in positioning operations, for example.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

Wireless communication techniques described herein may be employed in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. The term "network" and "communication network" may be used interchangeably herein. A VLC communications network may comprise a network of devices employing visual light communications. A WWAN may comprise a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

As used herein, the term "access point" is meant to include any wireless communication station and/or device used to facilitate access to a communication service by another device in a wireless communications system, such as, for example, a WWAN, WLAN or WPAN, although the scope of claimed subject matter is not limited in this respect. In another aspect, an access point may comprise a WLAN access point, cellular base station or other device enabling access to a WPAN, for example. Likewise, as previously discussed, an access point may also engage in VLC communications.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

In the context of the present disclosure, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

As suggested previously, communications between a computing device and/or a network device and a wireless network may be performed in accordance with known and/or to be developed network protocols including, for example, wireless communication protocols mentioned above. A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method at an imaging device comprising:
   a first sampling of one or more Visual Light Communication (VLC) signal intensities at an array of pixel elements to generate a first frame of pixel sample values;
   identifying a subset of pixel elements in the array of pixel elements to include pixel elements that receive at least a portion of detectable light comprising a light intensity modulated signal transmitted from one or more VLC light sources based, at least in part, on the first frame of pixel sample values;
   a second sampling of one or more VLC signal intensities at the array of pixel elements to generate a second frame of pixel sample values; and
   limiting processing of the second frame of pixel sample values to pixel sample values of the second frame of pixel sample values generated by the subset of pixel elements in the array of pixel elements, wherein limiting processing of the second frame of pixel sample values comprises:
      generating a signal at a VLC decoder device indicative of the subset of pixel elements; and
      limiting processing of the pixel sample values of the second frame of pixel sample values based, at least in part, on the signal indicative of the subset of pixel elements.

2. A method at an imaging device comprising:
   a first sampling of one or more Visual Light Communication (VLC) signal intensities at an array of pixel elements to generate a first frame of pixel sample values;
   identifying a subset of pixel elements in the array of pixel elements to include pixel elements that receive at least a portion of detectable light comprising a light intensity modulated signal transmitted from one or more VLC light sources based, at least in part, on the first frame of pixel sample values, wherein the subset of pixel elements in the array of pixel elements covers a first region of pixel elements in the array of pixel elements;
   a second sampling of one or more VLC signal intensities at the array of pixel elements to generate a second frame of pixel sample values;
   limiting processing of the second frame of pixel sample values to pixel sample values of the second frame of pixel sample values generated by the subset of pixel elements in the array of pixel elements; and
   limiting processing of pixel sample values of a third frame of pixel sample values from a third sampling of the one or more VLC signal intensities to a second region of pixel elements in the array of pixel elements within the first region of pixel elements in the array of pixel elements based, at least in part, on the pixel sample values of the second frame of pixel sample values.

3. The method of claim 2, further comprising determining the second region of pixel elements in the array of pixel elements based, at least in part, on a measured change in orientation of the imaging device relative to at least one of the one or more VLC light sources.

4. The method of claim 1, further comprising determining the subset of pixel elements based, at least in part, on detecting jitter of the imaging device.

5. The method of claim 4, further comprising determining the subset of pixel elements in the array of pixel elements to cover a region receiving light from at least one of the one or more VLC light sources.

6. The method of claim 1, further comprising determining the subset of pixel elements based, at least in part, on a measured level of jitter of the imaging device.

7. An imaging device, comprising:
   an array of pixel elements configured to receive one or more Visual Light Communication (VLC) signals;
   digital sampling circuitry to sample an intensity of the one or more VLC signals at pixel elements of the array of pixel elements and generate successive frames of pixel sample values;
   circuitry to receive a first frame of pixel sample values and a second frame of pixel sample values from the successive frames of pixel sample values generated by the digital sampling circuitry,
   wherein the circuitry is further to identify a subset of pixel elements in the array of pixel elements to include pixel elements that receive at least a portion of detectable light comprising a light intensity modulated signal transmitted from one or more VLC light sources based, at least in part, on the first frame of pixel sample values; and
   circuitry to limit the processing of the second frame of pixel sample values to pixel sample values of the second frame of pixel sample values generated by the subset of pixel elements, wherein the circuitry to limit the processing is further to generate a signal at a VLC decoder device indicative of the subset of pixel elements, and further to limit processing of the pixel sample values of the second frame of pixel sample values based, at least in part, on the signal indicative of the subset of pixel elements.

8. An imaging device, comprising:
an array of pixel elements configured to receive one or more Visual Light Communication (VLC) signals;
digital sampling circuitry to sample an intensity of the one or more VLC signals at pixel elements of the array of pixel elements and generate successive frames of pixel sample values;
circuitry to receive a first frame of pixel sample values and a second frame of pixel sample values from the successive frames of pixel sample values generated by the digital sampling circuitry,
wherein the circuitry is further to identify a subset of pixel elements in the array of pixel elements to include pixel elements that receive at least a portion of detectable light comprising a light intensity modulated signal transmitted from one or more VLC light sources based, at least in part, on the first frame of pixel sample values, wherein the subset of pixel elements in the array of pixel elements covers a first region of pixel elements in the array of pixel elements;
circuitry to limit the processing of the second frame of pixel sample values to pixel sample values of the second frame of pixel sample values generated by the subset of pixel elements; and
circuitry to limit processing of pixel sample values of a third frame of pixel sample values of the successive frames of pixel sample values to a second region of pixel elements in the array of pixel elements within the first region of pixel elements in the array of pixel elements based, at least in part, on the pixel sample values of the second frame of pixel sample values.

9. The imaging device of claim 8, wherein the circuitry is further to determine the second region of pixel elements in the array of pixel elements based, at least in part, on a measured change in orientation of the imaging device relative to at least one of the one or more VLC light sources.

10. The imaging device of claim 7, wherein the circuitry is further to determine the subset of pixel elements based, at least in part, on a detected jitter of the imaging device.

11. The imaging device of claim 10, further comprising circuitry to determine the subset of pixel elements in the array of pixel elements to cover a region receiving light from at least one of the one or more VLC light sources.

12. The imaging device of claim 7, wherein the circuitry is further to determine the subset of pixel elements based, at least in part, on a measured level of jitter of the imaging device.

13. A mobile device comprising:
means for a first sampling of one or more Visual Light Communication (VLC) signal intensities at an array of pixel elements to generate a first frame of pixel sample values;
means for identifying a subset of pixel elements in the array of pixel elements to include pixel elements that receive at least a portion of detectable light comprising a light intensity modulated signal transmitted from one or more VLC light sources based, at least in part, on pixel sample values of the first frame of pixel sample values;
means for a second sampling of one or more VLC signal intensities at the array of pixel elements to generate a second frame of pixel sample values; and
means for limiting processing of the second frame of pixel sample values to pixel sample values of the second frame of pixel sample values generated by the subset of pixel elements in the array of pixel elements, wherein the means for limiting processing of the second frame of pixel sample values further comprises:
means for generating a signal at a VLC decoder device indicative of the subset of pixel elements; and
means for limiting processing of the pixel sample values of the second frame of pixel sample values based, at least in part, on the signal indicative of the subset of pixel elements.

14. The mobile device of claim 13, further comprising means for determining the subset of pixel elements based, at least in part, on a detected jitter of an imaging device.

15. The mobile device of claim 13, further comprising means for determining the subset of pixel elements based, at least in part, on a measured level of jitter of an imaging device.

16. A mobile device comprising:
means for a first sampling of one or more Visual Light Communication (VLC) signal intensities at an array of pixel elements to generate a first frame of pixel sample values;
means for identifying a subset of pixel elements in the array of pixel elements to include pixel elements that receive at least a portion of detectable light comprising a light intensity modulated signal transmitted from one or more VLC light sources based, at least in part, on pixel sample values of the first frame of pixel sample values, wherein the subset of pixel elements in the array of pixel elements covers a first region of pixel elements in the array of pixel elements;
means for a second sampling of one or more VLC signal intensities at the array of pixel elements to generate a second frame of pixel sample values;
means for limiting processing of the second frame of pixel sample values to pixel sample values of the second frame of pixel sample values generated by the subset of pixel elements in the array of pixel elements; and
means for limiting processing of pixel sample values of a third frame of pixel sample values from a third sampling of the one or more VLC signal intensities to a second region of the pixel elements in the array of pixel elements within the first region of pixel elements in the array of pixel elements based, at least in part, on the pixel sample values of the second frame of pixel sample values.

17. The mobile device of claim 16, further comprising means for determining the second region of the pixel elements in the array of pixel elements based, at least in part, on a measured change in orientation of an imaging device relative to at least one of the one or more VLC light sources.

18. The mobile device of claim 17, further comprising means for determining the subset of pixel elements in the array of pixel elements to cover a region receiving light from at least one of the one or more VLC light sources.

19. A non-transitory storage medium comprising computer readable instructions stored thereon which are executable by a processor of a mobile device to:
sample one or more Visual Light Communication (VLC) signal intensities at an array of pixel elements to generate a first frame of pixel sample values;

identify a subset of pixel elements in the array of pixel elements to include pixel elements that receive at least a portion of detectable light comprising a light intensity modulated signal transmitted from one or more VLC light sources based, at least in part, on pixel sample values of the first frame of pixel sample values;

sample one or more VLC signal intensities at the array of pixel elements to generate a second frame of pixel sample values; and process pixel sample values of the second frame of pixel sample values generated by the subset of pixel elements in the array of pixel elements, wherein the instructions configured to cause the processor to process the pixel sample values comprise instructions configured to cause the processor to:

generate a signal at a VLC decoder device indicative of the subset of pixel elements; and process the pixel sample values of the second frame of pixel sample values generated by the subset of pixel elements based, at least in part, on the signal indicative of the subset of pixel elements.

20. The non-transitory storage medium of claim 19, further comprising instructions to determine the subset of pixel elements based, at least in part, on detected jitter of an imaging device.

21. The non-transitory storage medium of claim 19, further comprising instructions to determine the subset of pixel elements based, at least in part, on a measured level of jitter of an imaging device.

22. A non-transitory storage medium comprising computer readable instructions stored thereon which are executable by a processor of a mobile device to:

sample one or more Visual Light Communication (VLC) signal intensities at an array of pixel elements to generate a first frame of pixel sample values;

identify a subset of pixel elements in the array of pixel elements to include pixel elements that receive at least a portion of detectable light comprising a light intensity modulated signal transmitted from one or more VLC light sources based, at least in part, on pixel sample values of the first frame of pixel sample values, wherein the subset of pixel elements in the array of pixel elements covers a first region of pixel elements in the array of pixel elements;

sample one or more VLC signal intensities at the array of pixel elements to generate a second frame of pixel sample values;

process pixel sample values of the second frame of pixel sample values generated by the subset of pixel elements in the array of pixel elements; and process pixel sample values of a third frame of pixel sample values from a third sampling of the one or more VLC signal intensities limited to a second region of the pixel elements in the array of pixel elements within the first region of pixel elements in the array of pixel elements based, at least in part, on the pixel sample values of the second frame of pixel sample values.

23. The non-transitory storage medium of claim 22, further comprising instructions to determine the second region of the pixel elements in the array of pixel elements based, at least in part, on a measured change in orientation of an imaging device relative to at least one of the one or more VLC light sources.

24. The non-transitory storage medium of claim 23, further comprising instructions to determine the subset of pixel elements in the array of pixel elements to cover a region receiving light from at least one of the one or more VLC light sources.

25. The method of claim 6, further comprising determining the measured level of jitter of the imaging device based at least in part on detecting movement of image boundaries.

* * * * *